(No Model.)

J. E. FERNLEY & W. F. CHARLESON.
AIR BRAKE COUPLING.

No. 553,498. Patented Jan. 21, 1896.

Witnesses:
Frank P. Prindle
Henry C. Hazard

Inventors:
James E. Fernley & W. F. Charleson,
by Prindle and Russell, his attys

UNITED STATES PATENT OFFICE.

JAMES E. FERNLEY AND WILLIAM F. CHARLESON, OF AURORA, ILLINOIS.

AIR-BRAKE COUPLING.

SPECIFICATION forming part of Letters Patent No. 553,498, dated January 21, 1896.

Application filed July 17, 1895. Serial No. 556,287. (No model.)

*To all whom it may concern:*

Be it known that we, JAMES E. FERNLEY and WILLIAM F. CHARLESON, of Aurora, in the county of Kane, and in the State of Illinois, have invented certain new and useful Improvements in Air-Brake Couplings; and we do hereby declare that the following is a full, clear, and exact description thereof, reference being had to the accompanying drawings, in which—

Figure 1:
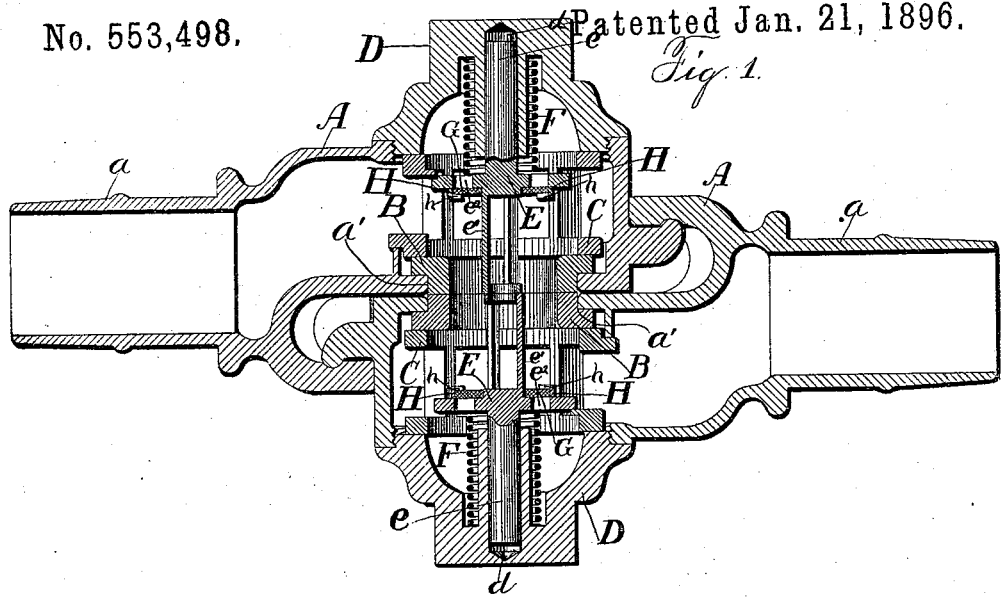
Figure 2:
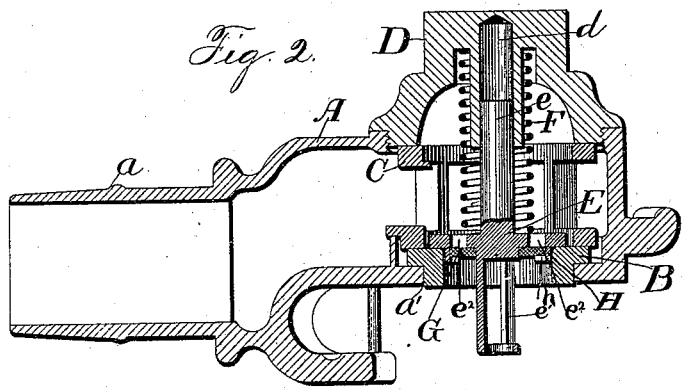
Figure 3:
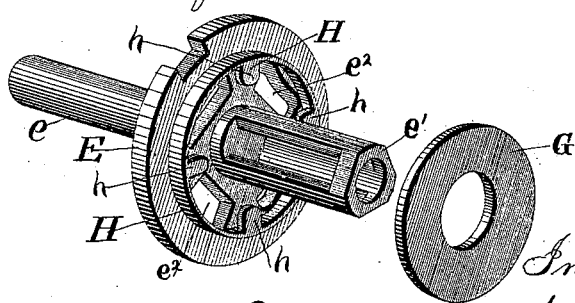

Figure 1 is a horizontal section of two connected air-brake couplings provided with our improvements. Fig. 2 is a like view of one of said couplings, and Fig. 3 is a detail perspective view of the valve with the flexible diaphragm shown separated therefrom.

Letters of like name and kind refer to like parts in each of the figures.

The object of our invention is to prevent the entrance of cinders, dust, &c., into the pipes or hose of air-brakes when the same are uncoupled; and to this end said invention consists in the coupling having the construction hereinafter specified.

Our invention has been designed for use more especially with brake systems of the automatic air class, and is applicable to any of the usual forms of couplings.

The coupling shown in the drawings is of ordinary construction, comprising a chambered casing A having a pipe extension $a$ for the attachment of the flexible pipe or hose and having a horizontal opening $a'$ for communication with a connected coupling. A ring or washer B of rubber or other elastic material is placed within the opening $a'$, being held in place by an open or slotted cylinder or cage C that engages the washer at one end and is itself at its other end engaged by a cap D screwed into a threaded opening in the casing A. Within the cage C is a valve E movable to and from the washer B to close and unclose the opening $a$, said washer forming the seat of the valve. From the inner side of the valve E there projects a stem $e$ that at its free end enters and is guided by an opening $d$ in the cap D. Surrounding said stem and bearing at one end against the inner side of the cap and at its other end against the inner face of the valve is a coiled spring F that operates to press and yieldingly hold the valve upon its seat. From the outer face of the valve there projects a second stem $e'$ of such length as to be engaged by the similar stem of another coupling when the two are connected together and thereby be moved inward to force the valve off its seat to leave the opening $a$ free for the passage of air from one coupling to the other. Preferably the stem $e'$ is slotted or made open to offer as little obstruction as possible to the passage of air. It will be perceived that as soon as two couplings are disconnected, and hence restraint removed from the stem $e'$, the coiled spring will operate to promptly move the valve to its seat to close the coupling and prevent the entrance of dust, cinders, and other objectionable material.

Of course from whatever cause the coupling may be disconnected the valve will be operated, as above described, to close the opening $a$, and as the closing of the latter would be objectionable when a break in the train occurs, since the automatic application of the brakes would thereby be prevented, it is necessary to provide for the discharge of air from the train-pipe under the circumstances just indicated. To enable this to be done, we provide the valve E with several openings $e^2$ and $e^2$, and cover the latter by a flexible diaphragm G placed against the outer side of the valve, from which it may be blown by an excess of air-pressure within the coupling. Several fingers $h$ and $h$ projecting inwardly from an annular flange H encircling the diaphragm slightly overlap the edge of the latter and hold the same from being accidentally displaced under normal conditions. The diaphragm will of course yield and pass by the fingers $h$ and $h$ when being put in or removed from position over the valve-openings $e^2$ and $e^2$.

By our invention we provide a simple yet thoroughly efficient device for automatically closing air-brake couplings against the admission of objectionable substances, and one that through the use of the blow-out diaphragm or supplemental valve G enables the brakes to be promptly applied upon the breaking of the train.

To use one of our couplings with a coupling not having the valve, it is simply necessary to remove the diaphragm G.

Having thus described our invention, what we claim is—

1. The combination of an air brake coupling, a valve for closing the opening thereof, and a supplemental valve for permitting the discharge of air from the coupling, that is operated by the air pressure within the latter, substantially as and for the purpose shown.

2. The combination of an air brake coupling, a perforated valve for closing the opening thereof, and a movable cover for the perforated valve, to permit the discharge of air from the coupling, substantially as and for the purpose set forth.

3. The combination of an air brake coupling, a perforated valve for closing the opening thereof, a flexible diaphragm upon the outer side of the valve, and fingers overlapping the edge of the diaphragm, substantially as and for the purpose described.

In testimony that we claim the foregoing we have hereunto set our hands this 18th day of June, 1895.

JAMES E. FERNLEY.
WILLIAM F. CHARLESON.

Witnesses:
JNO. P. GLASS,
JOHN W. MILLER.